Figure 1:
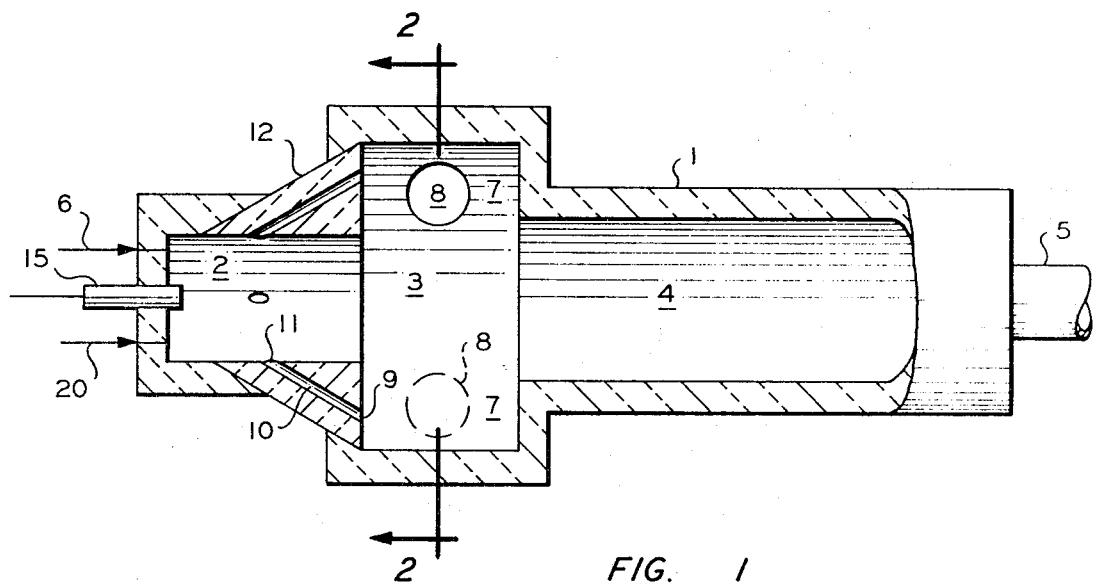

United States Patent

[11] 3,615,214

[72] Inventors Glenn J. Forseth
Borger, Tex.;
Eulas W. Henderson, Bartlesville, Okla.;
Robert E. Dollinger, Borger, Tex.; Sheldon
A. Cunningham, Corvallis, Oreg.
[21] Appl. No. 810,965
[22] Filed Mar. 27, 1969
[45] Patented Oct. 26, 1971
[73] Assignee Phillips Petroleum Company

[54] CARBON BLACK PROCESS AND APPARATUS
10 Claims, 2 Drawing Figs.
[52] U.S. Cl. .................................................... 23/209.4,
.23/259.5
[51] Int. Cl. ...................................................... C09c 1/50
[50] Field of Search............................................ 23/209.1,
209.6, 259.5

[56] References Cited
UNITED STATES PATENTS
3,333,928  8/1967   Kobayashi ..................... 23/209.6
3,355,247  11/1967  Krejci et al. ................... 23/209.4
3,523,757  9/1970   Knight ........................... 23/259.5
3,523,759  8/1970   Kidd .............................. 23/259.5

Primary Examiner—Edward J. Meros
Attorney—Young and Quigg

ABSTRACT: The production of carbon black by the pyrolytic decomposition of a hydrocarbon feed within a reactor having an axial zone, a precombustion zone, a combustion zone, and a reaction zone wherein flow of a portion of the reactants is established between the axial zone and the precombustion zone through at least one conduit connecting said zones.

PATENTED OCT 26 1971  3,615,214

INVENTORS
G. J. FORSETH
E. W. HENDERSON
R. E. DOLLINGER
S. A. CUNNINGHAM

BY Young & Quigg
ATTORNEYS

CARBON BLACK PROCESS AND APPARATUS

This invention relates to carbon black.

In one of its more specific aspects, this invention relates to a method and to apparatus employable for the control of carbon black properties.

In an axial tunnel reactor, there is conventionally provided a first, or axial, zone into which the make-oil is introduced, a combustion zone axially contiguous with the axial zone, and a reaction zone wherein a principal portion of the carbon black is considered as being formed. Peripheral to the combustion zone is the precombustion zone from which some portion of reactants enter the combustion zone, these reactants generally being introduced into the precombustion zone through one or more introductory tunnels.

Axial tunnel reactors are capable of producing a variety of carbon blacks. However, modifications of either the process or of the apparatus which broaden the range of the quality of the carbon black producible in any single reactor are desirable.

The method of this invention provides such a broadening. According to this invention there is provided a method for the production of carbon black in the furnace process which comprises establishing a first reaction mass within a first zone of a carbon black reactor, establishing a second reaction mass within the precombustion zone, establishing flow between the first reaction mass in the first zone and the second reaction mass of the precombustion zone, conducting at least a part of said first reaction mass axially into a second reaction zone, conducting at least a part of the second reaction mass into the second reaction zone through the periphery of the second reaction zone to establish a third reaction mass and conducting the third reaction mass under carbon black forming conditions into a third reaction zone to form carbon black.

The apparatus of this invention provides a carbon black reactor comprising an axial zone in axial contiguous alignment with a combustion zone and a reaction zone, said combustion zone being in open uninterposed peripheral communication with a precombustion zone.

In one embodiment of this invention, flow is established from the first zone into the precombustion zone.

In another embodiment of this invention, flow is established from the precombustion zone into the first zone.

The method and apparatus of this invention are applicable to the conventional conditions of carbon black production and to the wide variations of conditions under which furnace carbon black processes can be conducted and the reactants introduced. For example, the method and apparatus are applicable to processes employing any suitable feed, fuel and oxidant, introduced separately or in combination at any one of the conventional multiplicity of introduction points to form carbon black under any of the conditions known in the art.

Figure 2:
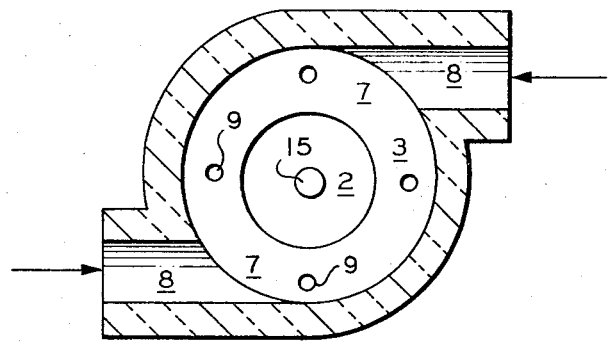

The method and apparatus of this invention will be more easily understood if explained with reference to the attached drawings in which FIG. 1 schematically shows the apparatus of this invention in elevation and FIG. 2 shows a cross-sectional view of the reactor of FIG. 1 taken through section 2—2.

Referring now to FIG. 1, there is shown in outline the internal configuration of reactor 1 composed of an axial first zone 2, combustion zone 3 and reaction zone 4, carbon black being removed from reaction zone 4 through nozzle 5.

Axial zone 2 is equipped with a hydrocarbon make-oil or feed burner, or inlet 15, and conduits 6 and 20 for the introduction of an oxidant, such as air, and a fuel, such as natural gas.

Combustion zone 3 has positioned peripherally to it precombustion zone 7 from which reactants introduced through ports 8 enter combustion zone 3 through its outer periphery, which entry may be tangentially or radially. Zones 2, 3 and 4 are in axial, contiguous alignment with precombustion zone 7 being in open communication with combustion zone 3.

Opening into precombustion zone 7 through opening 9 is one or more auxiliary tunnels 10 which extend from zone 2 through opening 11 therein. These tunnels may be individual conduits or may be formed in a portion of the insulation 12 of the reactor. In either instance they provide uninterposed communication between axial zone 2 and precombustion zone 7, that is, there is no interposed zone therein between, as exists, for example, in that axial zone 2 is also in communication with precombustion zone 7 through what may be considered as interposed combustion zone 3.

Any number of tunnels 10 can be employed. It is preferable that they open in uniform arrangement into precombustion chamber 7. Relatedly, the size of the tunnels will depend upon the relative pressures at the location of openings 9 and 11, it being desirable that these openings be as large as convenient in order to facilitate gas flow between the two zones, generally only small differential pressures existing therebetween.

These tunnels can be of any suitable configuration and may exit from axial zone 2 at any point along its wall, doing so preferably, however, downstream of the point of introduction of the make-oil or other reactants, that is, from a point after which reactant introduction into the axial zone 2 has been completed, but sufficiently upstream of combustion zone 3 that a minimum of those gases entering zone 3 from precombustion zone 7 are circulated back through opening 11 into tunnel 10 and into precombustion zone 7.

Suitable flow control adjuncts can be employed to control the quantity of flow through tunnels 10 and also the direction of flow therethrough. The tunnels can be equipped with flow control means, for example, valves by which the quantity of flow is regulated. Similarly, the tunnels can be equipped at either openings 9 and 11 with deflectors which direct the gases into the tunnel from either direction, depending upon the results desired.

It is also possible to construct between precombustion zone 7 and combustion zone 3, a suitable restriction to flow of such dimension as to facilitate the flow of reactants introduced into zone 7 through tunnels 10 and into zone 2. In other words, depending upon the quantity of reactants introduced into precombustion zone 7 and the restriction between zone 7 and zone 3, flow can be established in any direction through tunnels 10. Such restrictions include orifices, apertured walls and any means of limiting the flow therethrough to effect flow through the tunnels 10.

The following data indicate the results of operating in accordance with the method of this invention.

A series of runs were made in which make-oil rates to the axial zone were varied as were the quantities of axial air introduced through nozzle 6 and axial gas through nozzle 20. Make-oil inlet 15 was located in the same discharge position in all runs.

Precombustion air was introduced with the precombustion gas into ports 8, the combustion gas produced being introduced into zone 7 and from there through the periphery of combustion zone 3.

The feedstock in all instances was a typical liquid hydrocarbon, one oil being run in Runs I and II and a different oil being employed in Runs III through VI.

The reactor consisted of a 15 inch diameter axial zone, a 17 inch diameter combustion zone and a 10 inch diameter reaction zone. The internal overall diameter through the precombustion zone was 37 inches.

Four 2 inch diameter tunnels were formed in refractory and interconnected the axial zone at symmetrical points, 90° apart, with the precombustion zone. The openings 11 of the axial zone were positioned about 10 inches upstream from the entrance into the combustion zone, the make-oil inlet nozzle 15 discharging into the axial zone at the same point, that is, 10 inches upstream from the vertical inlet wall of the combustion zone.

In all runs, quench points were positioned to produce black of comparable photelometer. Results were as shown in table I.

TABLE I

| | Run | | | | | |
|---|---|---|---|---|---|---|
| | I | II | III | IV | V | VI |
| "Tunnels" | Yes | No | Yes | No | Yes | No |
| Oil rate, g.p.h | 350 | 349 | 300 | 297 | 300 | 297 |
| Axial air, M s.c.f.h | 35 | 35 | 55 | 55 | 65 | 65 |
| Axial gas, M s.c.f.h | | | 3.67 | 3.67 | 4.33 | 4.33 |
| Precombustion air, M s.c.f.h | 175 | 175 | 175 | 175 | 165 | 165 |
| Precombustion gas, M s.c.f.h | 11.67 | 11.67 | 11.67 | 11.67 | 11.0 | 11.0 |
| Photelometer | 90 | 92 | 92 | 90 | 91 | 91 |
| DBP, cc./100 gm | 143 | 153 | 134 | 137 | 132 | 140 |
| Yield, Number C/gal | 4.65 | 4.8 | 4.0 | 4.0 | 3.8 | 3.6 |
| Conv., percent C to CB | 50 | 51.7 | 43.0 | 43.3 | 41.3 | 39.1 |

These data indicate that the method and apparatus of this invention are effective in altering the property of the black produced. Generally, these data indicate that the method and apparatus of this invention can be used to alter under conditions of essentially constant photelometer the structure of the carbon black.

It will be seen from the above description that a portion of that reaction mass formed in the axial zone can be conducted directly into the combustion zone while a second portion is conducted into the precombustion zone. To this second portion introduced into the precombustion zone is introduced some portion of the reactants, generally of a similar nature to those introduced into the axial zone, to form a second reaction mass which upon being introduced into the combustion zone combines with that first reactant mass introduced directly from the axial zone to form a third, or combined, reaction mass which is conducted, under carbon black forming conditions, into the reaction zone to form carbon black.

Alternately, depending upon establishing flow from the precombustion zone to the axial zone, a first portion of that reaction mass formed in the precombustion zone is conducted into the axial zone while a second portion is conducted into the combustion zone. The first portion introduced into the axial zone combines with the reactants introduced into the axial zone to form a combined first reaction mass which is introduced into the second reaction zone where it is combined with that second portion conducted into the combustion zone from the precombustion zone. The resulting third, or combined, reaction mass is thereupon conducted, under carbon black forming conditions, into the reaction zone to form carbon black.

It will be evident from the above that modifications can be made to both the method and apparatus as explained above. However, such are considered as being within the scope of the invention.

What is claimed is:

1. A process for the production of carbon black by the pyrolytic decomposition of a hydrocarbon feed within a reactor having an axial zone, a precombustion zone, a combustion zone and a reaction zone by bringing said hydrocarbon feed to its carbon black forming temperature by contacting said hydrocarbon feed with hot combustion gases produced by the oxidation of a fuel with a free oxygen-containing gas which comprises:
   a. introducing a hydrocarbon feed, a free oxygen-containing gas and a fuel into the axial zone and oxidizing said fuel to produce hot combustion gases and to form a first reactant mass comprising said feed and hot combustion gases;
   b. introducing through the circumferential periphery of said reactor into the precombustion zone hot combustion gases;
   c. passing a portion of said hot combustion gases from said precombustion zone into said axial zone and into contact with said first reactant mass to form a second reactant mass, said portion being passed into said axial zone through conduit means discharging into said axial zone upstream of the entrance of said second reactant mass into said combustion zone as defined in step (d);
   d. passing said second reactant mass from said axial zone and hot combustion gases from said precombustion zone into the combustion zone to form a third reactant mass;
   e. passing said third reactant mass into the reaction zone under carbon black forming conditions to form carbon black; and,
   f. recovering the carbon black.

2. A process for the production of carbon black by the pyrolytic decomposition of a hydrocarbon feed within a reactor having an axial zone, a precombustion zone, combustion zone and a reaction zone by bringing said hydrocarbon feed to its carbon black forming temperature by contacting said hydrocarbon feed with hot combustion gases produced by the oxidation of a fuel with a free oxygen-containing gas which comprises:
   a. introducing a hydrocarbon feed, a free oxygen-containing gas and a fuel into the axial zone and oxidizing said fuel to produce hot combustion gases and to form a first reactant mass comprising said feed and hot combustion gases;
   b. introducing through the circumferential periphery of said reactor into the precombustion zone hot combustion gases;
   c. passing a portion of said first reactant mass from said axial zone into said precombustion zone and into contact with said hot combustion gases to form a second reactant mass, said portion being passed through conduit means discharging into said precombustion zone upstream of the entrance of said second reactant mass into said combustion zone as defined in step (d);
   d. passing said second reactant mass from said precombustion zone and said first reactant mass from said axial zone into the combustion zone to form a third reactant mass;
   e. passing said third reactant mass into the reaction zone under carbon black forming conditions to form carbon black; and,
   f. recovering the carbon black.

3. The process of claim 1 in which hot combustion gases are passed from said precombustion zone into said axial zone through a plurality of conduits.

4. The process of claim 1 in which said hot combustion gases passed from said precombustion zone into said axial zone enter said axial zone downstream from the locus of the introduction of said hydrocarbon feed into said axial zone.

5. The process of claim 2 in which the first reactant mass is passed from said axial zone into said precombustion zone through a plurality of conduits.

6. The process of claim 2 in which said first reactant mass is passed from said axial zone into said precombustion zone from a locus within said axial zone downstream of the introduction of said hydrocarbon feed into said axial zone.

7. A carbon black furnace reactor comprising:
   a. an axial zone, a combustion zone and a reaction zone in axial contiguous alignment, said axial zone being adapted with conduit means for the introduction of reactants thereinto, said axial zone adapted to discharge into said combustion zone, said reaction zone being adapted with conduit means for the recovery of carbon black therefrom;
   b. a precombustion zone positioned circumferentially to said combustion zone and discharging into said combustion zone through the periphery thereof, said precombustion zone being adapted with conduit means for the introduction of hot combustion gases thereinto; and,
   c. at least one conduit communicating between said axial zone and said precombustion zone, said conduit opening into said axial zone upstream of the locus of discharge from said axial zone into said combustion zone, said conduit opening into said precombustion zone upstream of the locus of discharge from said precombustion zone into said combustion zone.

8. The carbon black reactor of claim 7 in which said conduit communicating between said axial zone and said precombustion zone opens from said axial zone downstream from the locus of discharge of said conduit means adapted for the discharge of reactants into said axial zone.

9. The carbon black reactor of claim 7 having a plurality of conduits communicating between said axial zone and said precombustion zone.

10. The carbon black reactor of claim 7 in which flow control means are positioned within said conduit.

* * * * *